United States Patent Office 3,649,615
Patented Mar. 14, 1972

3,649,615
PHENYL-AZO-NAPHTHOL DYES
Takuo Ikeda, Ibaragi-shi, Otohei Matsumoto, Toyonaka-shi, and Hiroshi Sugiyama, Ashiya-shi, Japan, assignors to Sumitomo Chemical Company, Ltd., Osaka, Japan
No Drawing. Filed June 19, 1969, Ser. No. 834,907
Claims priority, application Japan, July 3, 1968, 43/48,017; July 11, 1968, 43/48,903; Sept. 12, 1968, 43/65,784, 43/65,785
Int. Cl. C07c 107/08; C09b 29/30
U.S. Cl. 260—199
4 Claims

ABSTRACT OF THE DISCLOSURE

A monoazo dye of the formula, as a free acid,

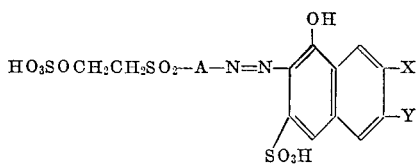

wherein A is a benzene ring unsubstituted or substituted with a lower alkyl group, a lower alkoxy group or a halogen atom and one of X and Y is hydrogen atom and the other is

—NHCOCH$_2$CH$_2$COOH or

—NHCOCH=CHCOOH

The dye is produced by reacting a diazotized amine having the formula,

ZCH$_2$CH$_2$SO$_2$—A—NH$_2$ wherein A is as defined above and Z is hydroxy group or —OSO$_3$H, with an α-naphthol derivative having the formula,

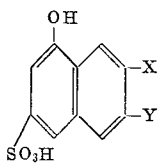

wherein X and Y are as defined above, and treating the resultant having β-hydroxyethyl sulfonyl group with a sulfating agent.

The dye may be used for dip-, pad-dyeing or printing textile fibers.

---

The present invention relates to a novel orange dye, a process for the preparation thereof and a process for dyeing fibers therewith, said monoazo dye being represented by the general formula, in the form of a free acid,

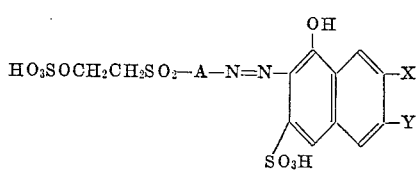

wherein A is a benzene ring unsubstituted or substituted with a lower alkyl group, a lower alkoxy group or a halogen atom, and one of X and Y is hydrogen atom, and the other is

—NHCOCH$_2$CH$_2$COOH or

—NHCOCH=CHCOOH

It is known per se that dyes having

—SO$_2$CH$_2$CH$_2$OSO$_3$H, —SO$_2$CH=CH$_2$ or

—SO$_2$CH$_2$CH$_2$Cl can be employed as reactive dyes for the dyeing of fibers.

In the course of reviewing the relationship between the structures and properties of these dyes, the present inventors have found that the monoazo dyes represented by the general Formula I are useful dyes having high solubilities and are capable of dyeing textile fibers in clear orange to red shade with good fastnesses.

The dyes of general Formula I in the present invention are novel per se and are prepared by the following process:

Namely, the dyes are prepared by reacting a diazotized amine of the formula,

ZCH$_2$CH$_2$SO$_2$—A—NH$_2$     (II)

wherein A is as defined above and Z is hydroxy group or —OSO$_3$H, with an α-naphthol derivative, as a free acid, of the formula,

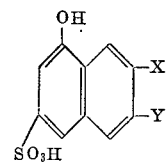

(III)

wherein X and Y are as defined above, and treating the resultant having hydroxy group as Z in the above Formula II with a sulfating agent.

In carrying out the present invention, the amines of the Formula II used in the process of this invention as a diazo component include, for example, 2-β-hydroxyethyl-sulfonylaniline,
3-β-hydroxyethylsulfonylaniline,
4-β-hydroxyethylsulfonylaniline,
2-methyl-5-β-hydroxyethylsulfonylaniline,
2-methoxy- or ethoxy-5-β-hydroxyethylsulfonylaniline,
4-methoxy or ethoxy-3-β-hydroxyethylsulfonylaniline,
2-chloro-5-β-hydroxysulfonylaniline,
2-methoxy-5-methyl-4-β-hydroxyethylsulfonylaniline,
2,5-dimethoxy- or diethoxy-4-β-hydroxyethylsulfonylaniline, and their sulfuric acid esters.

The α-naphthol derivatives of the Formula III can be readily obtained by the reaction of 6- or 7-amino-1-naphthol-3-sulfonic acid with succinic anhydride when one of X and Y is —NHCOCH$_2$CH$_2$COOH, and by the reaction of 6- or 7-amino-1-naphthol-3-sulfonic acid with maleic anhydride when one of X and Y is

—NHCOCH=CHCOOH

The diazotization of the amine of the Formula II can be effected by a method known in the art. The coupling with the α-naphthol derivative of the Formula III can be effected at relatively low temperature in an aqueous medium in a wide pH range, but preferably effected in a neutral or weakly acidic medium.

Where the monoazo dye obtained has a β-hydroxyethylsulfonyl group, said group can be changed to a β-sulfatoethylsulfonyl group by treating the dye in a sulfating agent, such as concentrated sulfuric acid, chlorosulfonic acid or a mixture thereof at a relatively low temperature, preferably at a temperature not higher than 25° C.

The dye of the Formula I may be prepared by another way wherein the diazotized amine of the Formula II is reacted with 6- or 7-amino-1-naphthol-3-sulfonic acid to obtain 2-azo-6- or 7-amino-1-naphthol-3-sulfonic acid, which is successively subjected to the acylation reaction with succinic anhydride or maleic anhydride.

In this way, however, it is difficult to obtain the 2-azo compound in pure state and high yield and to conduct the acylation reaction with easiness as well as in the production of the α-naphthol derivatives of the Formula III.

As described above, the dyes according to the present invention are novel per se and have more excellent solubilities, compared with that of the known dyes prepared using 6- or 7-acetylamino-1-naphthol-3-sulfonic acid as the coupling component. The dyes of this invention are particularly advantageous in that a printing paste containing high content of the dye may be readily obtained at low temperature and the paste thus obtained is highly stable during storage over a long period of time. Additionally, the dyes of this invention give dyeings with more clear shade, compared with that of the known dye mentioned above.

The dyeing obtained have a shade range as from clear yellowish orange to red, and have good fastnesses to washing and light.

The dyes of this invention are suitable for dyeing various fibers, particularly such natural and synthetic fibers as cotton, hemp, viscose rayons and viscose staple fibers, polyvinyl alcohol or polyamide fibers, clear orange to red shade.

The dyeing according to the process of this invention is applicable to a wide range of dyeing, including dip dyeing, printing and pad dyeing. The dip dyeing of cellulose fibers can be carried out in a Glauber's salt- or common salt-containing dye bath at a relatively low temperature in the presence of an acid binder, such as sodium tertiary phosphate, caustic soda or sodium carbonate.

The pad dyeing can be carried out by applying an aqueous solution of dye to a fiber, simultaneously or successively steaming or dry heating at a relatively high temperature, for example 70 to 180° C., in the presence of an acid binder, such as sodium bicarbonate, sodium carbonate, caustic soda or sodium tertiary phosphate, etc. Alternatively, the pad dyeing may be carried out by applying a dye to a fiber beforehand and then subjecting the fiber to a padding in a bath containing the aforesaid acid binder at a relatively high temperature, e.g. at 80 to 110° C. Furthermore, instead of steaming or dry heating, boiling in a water bath containing a large amount of inorganic salt may be applicable. The printing can be conducted by printing a paste containing a dye and the aforesaid acid binder on a fiber and thereafter steaming or dry heating the printed fiber at 70 to 180° C., or by heat-treating the fiber printed with the paste containing a dye only, in the bath containing the acid binder, or by printing binder-containing paste further on the fiber which is previously printed with a paste containing a dye only and then steaming or dry heating it. Herein a resist with a suitable acid, as well as a discharge with a suitable reducing agent is possible. The dip dyeing of natural or synthetic polyamide fibers may be carried out in a neutral or acidic bath according to the ordinary method or using a suitable cationic active agent, and the dyeing is preferably continued, after deposition of the dye on the fiber, by neutralizing the dye bath with a mild alkali, such as ammonia or hexamethylenetetramine.

The dye which has not been fixed on the fiber can readily be removed therefrom by soaping or washing the fiber with water upon completion of the dyeing.

The present invention may be illustrated with the following examples, which are, of course, not to limit the scope of the present invention.

Parts and percentage are by weight.

EXAMPLE 1

28.1 parts of 4-β-sulfatoethylsulfonylaniline was added to 280 parts of ice water and after adding 26 parts of hydrochloric acid thereto with vigorous stirring, diazotized using 4 N-sodium nitrite solution. One hour later, the excess nitric acid was decomposed with sulfamic acid and a solution of 34 parts of 6-succinylamino-1-naphthol-3-sulfonic acid in 250 parts of water was added to the diazo mixture prepared above. The reaction mixture was adjusted to pH 5 with 20% aqueous solution of sodium carbonate, whereby coupling was accomplished immediately. After adding 20% of potassium chloride, the reaction mixture was made strongly acidic by adding thereto hydrochloric acid and the resulting precipitate was filtered. The cake was placed in 250 parts of water and, while stirring vigorously, the mixture was adjusted to pH 6 with sodium carbonate. Evaporation at 60° C. under reduced pressure gave 84 parts of a yellowish brown powder. The dye thus obtained was printed on a cotton fabric using caustic soda as acid binder, whereby a very clear yellowish orange shade printing was obtained which had good fastness to washing and light.

EXAMPLE 2

20.1 parts of 3 - β - hydroxyethylsulfonylaniline was poured into 200 parts of ice water and after adding 26 parts of hydrochloric acid, the mixture was added with 4 N-sodium nitrite solution. After decomposing the excess nitric acid, a solution consisting of 34 parts of 6-succinylamino-1-naphthol-3-sulfonic acid and 250 parts of water was added to the diazo mixture and the mixture was adjusted to pH 6 to 7 with 20% aqueous solution of sodium carbonate, whereby coupling was completed.

Then, the pH of the reaction mixture was adjusted to 1 to 2 with hydrochloric acid and the precipitate was filtered. The cake obtained was placed in 150 parts of water and after adjusting the pH to 6 to 7 by adding 20% aqueous solution of sodium carbonate with vigorous stirring. Evaporation under reduced pressure gave 60 parts of dry powder. 50 parts of the dry powder was added slowly to 150 parts of 98% sulfuric acid at 15° C. and after stirring for 2 hours, the solution was poured onto 450 parts of ice. After adding 100 parts of potassium chloride, the precipitate formed was filtered and the cake obtained was placed in 150 parts of water and the pH of the solution was adjusted to 5 to 6 adding thereto 20% aqueous solution of sodium carbonate with vigorous stirring. Evaporation at 60° C. under reduced pressure gave 60 parts of a yellowish brown powder.

The dye thus obtained was printed on a cotton fabric using caustic soda as acid binder and a clear orange shade printing was obtained which was more yellowish than that obtained in Example 1. The printing had good fastness to washing and light.

EXAMPLES 3 TO 12

Using the amines or sulfuric acid esters thereof described in Column A and the coupling components described in Column B of the below table, the process described in Example 1 or 2 was conducted and dyes to give the shades described in Column C to a cotton fabric were obtained respectively.

TABLE

| Example No. | A Diazo component | B Coupling component | C Shade |
|---|---|---|---|
| 3 | 2-methoxy-5-β-hydroxyethylsulfonylaniline. | 6-succinylamino-1-naphthol-3-sulfonic acid. | Orange. |
| 4 | 4-methoxy-3-β-hydroxyethylsulfonylaniline. | ......do................. | Do. |
| 5 | 2-methoxy-5-methyl-4-β-hydroxyethylsulfonylaniline. | ......do................. | Scarlet. |
| 6 | 2-chloro-5-β-hydroxyethylsulfonylaniline. | ......do................. | Yellowish orange. |
| 7 | 2-β-hydroxyethylsulfonylaniline. | ......do................. | Do. |
| 8 | 4-β-hydroxyethylsulfonylaniline. | 7-succinylamino-1-naphthol-3-slfonic acid. | Reddish orange. |
| 9 | 3-β-hydroxyethylsulfonylaniline. | ......do................. | Do. |
| 10 | 2-methoxy-5-β-hydroxyethylsulfonylaniline. | ......do................. | Yellowish red. |
| 11 | 2-methoxy-5-methyl-4-β-hydroxyethylsulfonylaniline. | ......do................. | Red. |
| 12 | 4-methoxy-3-β-hydroxyethylsulfonylaniline. | ......do................. | Yellowish red. |

EXAMPLE 13

28.1 parts of 4-β-sulfatoethylsulfonylaniline was poured into 280 parts of ice water and 26 parts of hydrochloric acid was added thereto with vigorous stirring. Diazotization was effected using 4 N-sodium nitrite solution. After 1 hour stirring, the excess nitric acid was decomposed with sulfamic acid and 250 parts of aqueous solution containing 34 parts of 6-(β-carboxyacrylamino)-1-naphthol-3-sulfonic acid was added. The reaction mixture was adjusted to pH 5 with 20% aqueous solution of sodium carbonate. The coupling was accomplished immediately. After adding potassium chloride in an amount of 15% of the reaction mixture, the precipitate was filtered and dried at a temperature not higher than 70° C. to obtain 76 parts of a dye having the following formula:

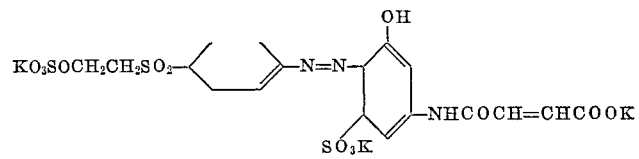

Using caustic soda as acid binder, the dye thus obtained was used for dyeing cotton by the printing method, whereby the cotton was dyed in a very clear yellowish orange shade with good fastness to washing and light. An excellent dyeing with high color value was also obtained by dip dyeing.

EXAMPLE 14

20.1 parts of 4-β-hydroxyethylsulfonylaniline was poured into a mixture of 200 parts of ice water and 26 parts of hydrochloric acid and diazotized with 4 N-sodium nitrite solution. After decomposing the excess nitric acid with sulfamic acid, a solution consisting of 34 parts of 6-(β-carboxyacrylamino)-1-naphthol-3-sulfonic acid and 250 parts of water was added and then the reaction mixture was adjusted with 20% aqueous solution of sodium carbonate to pH 6 to 7, whereby coupling was accomplished. The reaction mixture was salted out by adding thereto potassium chloride in an amount of 15% of a reaction mixture, and the resultant precipitate was filtered, dried and pulverized. 10 parts of the dry powder was slowly added to 40 parts of 100% sulfuric acid at 10° C. and after stirring for 2 hours, the mixture was poured into 120 parts of ice water. Then, 20 parts of potassium chloride was added and the precipitate was separated by filtration. The cake was immediately placed in 50 parts of water and the pH of the mixture was adjusted to 5 to 6 with 20% of sodium carbonate with vigorous stirring. 10 parts of potassium chloride was added and the precipitate was filtered and dried at a temperature not higher than 70° C. As a result, the same dye as that of Example 1 was obtained.

EXAMPLES 15 TO 22

Using the amines or sulfuric acid esters thereof described in Column A and the coupling components described in Column B of the below table, the process described in Example 13 or 14 was conducted and dyes to give the shades described in Column C to a cotton fabric were obtained respectively.

TABLE

| Example No. | A Diazo component | B Coupling component | C Shade |
|---|---|---|---|
| 15 | 2-methoxy-5-β-hydroxyethylsulfonylaniline. | 6-(β-carboxyacrylamino)-1-naphthol-3-sulfonic acid. | Orange. |
| 16 | 4-methoxy-3-β-hydroxyethylsulfonylaniline. | ......do................. | Do. |
| 17 | 2-methoxy-5-methyl-4-β-hydroxyethylsulfonylaniline. | ......do................. | Scarlet. |
| 18 | 2-chloro-5-β-hydroxyethylsulfonylaniline. | ......do................. | Yellowish orange. |
| 19 | 2-β-hydroxyethylsulfonylaniline. | ......do................. | Do. |
| 20 | 4-β-hydroxyethylsulfonylaniline. | 7-(β-carboxyacrylamino)-1-naphthol-3-sulfonic acid. | Reddish orange. |
| 21 | 3-β-hydroxyethylsulfonylaniline. | ......do................. | Do. |
| 22 | 2-methoxy-5-β-hydroxyethylsulfonylaniline. | ......do................. | Yellowish red. |

EXAMPLE 23

0.3 part of a dye represented by the formula,

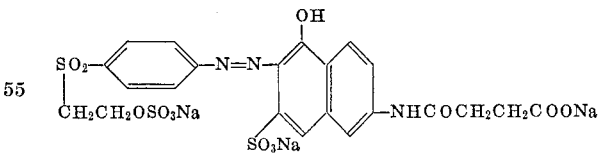

was dissolved in 200 parts of water, and 10 parts of Glauber's salt and 10 parts of cotton yarn were respectively added thereto, and the temperature was elevated to 60° C. Then, 2 parts of crystalline sodium tertiary phosphate was added, and its temperature was kept for 1 hour at said level.

Upon washing with water and soaping, a clear yellowish orange dyeing was obtained which had good fastness to washing and light.

A dye represented by the formula,

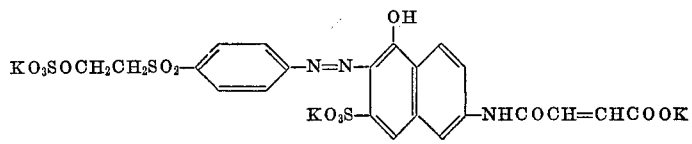

was used in the same way as mentioned above, thereby to obtain a clear yellowish orange dyeing which had good fastness to light and washing.

EXAMPLE 24

2 parts of a dye represented by the formula,

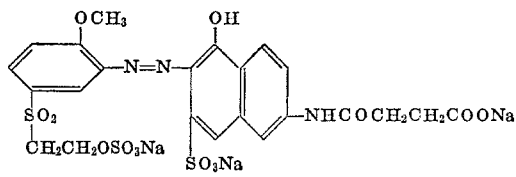

10 parts of urea and 2 parts of sodium bicarbonate were dissolved in 100 parts of water at below 20° C. and a cotton cloth was padded into the solution and dried preliminarily and then steamed for 7–10 minutes at 100–103° C. Upon washing with water and soaping, a clear orange dyeing was obtained which had good fastness to washing and light.

A dye represented by the formula,

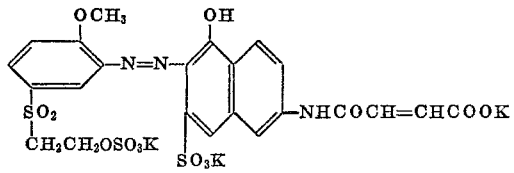

was used in the same way as mentioned above, thereby to obtain a clear orange dyeing which had good fastness to light and washing.

EXAMPLE 25

2 parts of a dye represented by the formula,

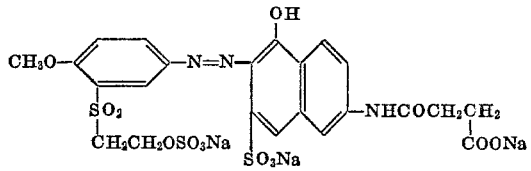

3 parts of sodium bicarbonate and 5 parts of urea were dissolved in 100 parts of water at below 20° C., and a cotton cloth was padded into the solution and dried preliminarily. Thereafter, the cloth was cured for 2 minutes at 140° C. Upon washing with water and soaping, a clear orange dyeing was obtained which had good fastness to light and washing.

A dye represented by the formula,

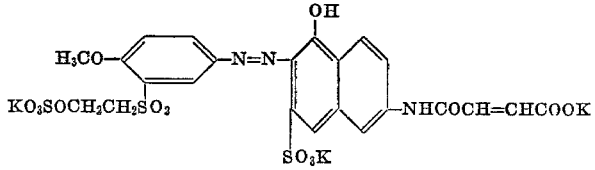

was used in the same way as mentioned above, thereby to obtain a clear orange dyeing which had good fastness to light and washing.

EXAMPLE 26

2 parts of a dye represented by the formula,

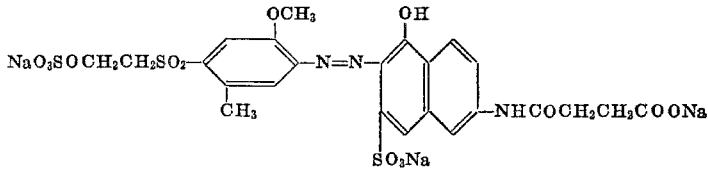

1 part of crystalline sodium tertiary phosphate and 1 part of 40° Bé. caustic soda were dissolved in 100 parts of water and a cotton cloth was padded into the solution. The padded cloth was wound up as such and allowed to stand at 40° C. for 10 hours. Upon washing with water and soaping, a clear scarlet dyeing was obtained which had good fastness to light and washing.

A dye represented by the formula,

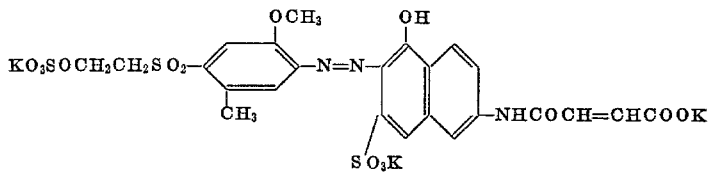

was used in the same way as mentioned above, thereby to obtain a clear scarlet dyeing which had good fastness to light and washing.

EXAMPLE 27

2 parts of a dye represented by the formula,

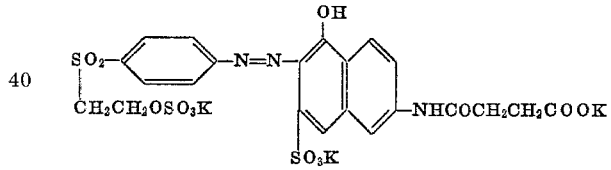

was dissolved in 100 parts of water and a cotton cloth was padded into the solution. After preliminary drying, the cloth was padded into a solution of 20 parts of common salt and 2 parts of caustic soda in 100 parts of water and thereafter steamed at 100 to 103° C. for 20 to 30 seconds. Upon washing with water and soaping, a clear reddish orange dyeing was obtained which had good fastness to light and washing.

A dye represented by the formula,

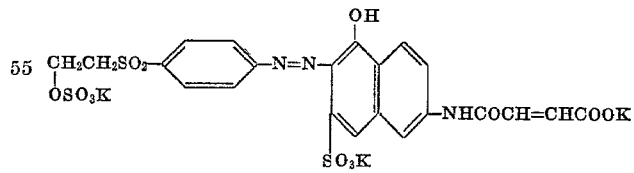

was used in the same way as mentioned above, thereby to obtain a red dyeing which had good fastness to light and washing.

EXAMPLE 28

2 parts of a dye represented by the formula,

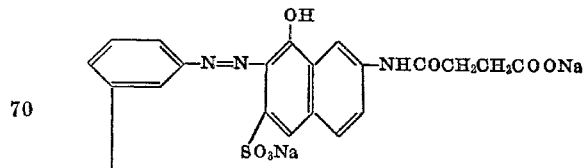

was dissolved in 100 parts of water and a cotton cloth was padded into the solution. After preliminary drying, the cloth was impregnated into a solution of 20 parts of sodium carbonate, 10 parts of common salt and 7 parts of 40° Bé. caustic soda in 100 parts of water, for 3 seconds at 90° C. Upon washing with water and soaping, a clear reddish orange dyeing was obtained which had good fastness to light and washing.

was used in the same way as mentioned above, thereby to obtain a yellowish orange dyeing which had good fastness to light and washing.

EXAMPLE 30

0.2 part of a dye represented by the formula,

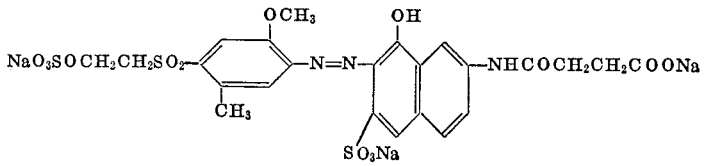

A dye represented by the formula,

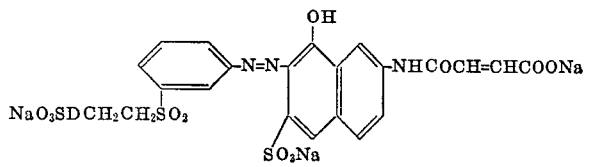

was dissolved in 300 parts of water and after adding 3 parts of acetic acid, 10 parts of wool was dipped into the solution and the dyeing was commenced at 50° C. and carried out at 90–100° C. for one hour. Then, the dyeing bath was neutralized with ammonium or hexamethylenetetramine and the dyeing was continued for about 30 minutes. Upon washing with water and soaping, a red dyeing with good fastness to light and washing was obtained.

A dye represented by the formula,

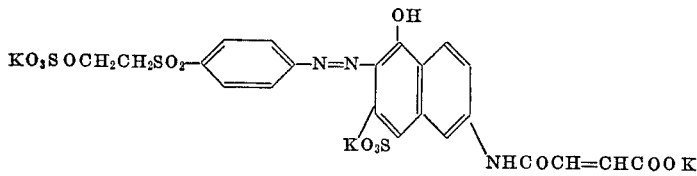

was used in the same way as mentioned above, thereby to obtain a reddish orange dyeing which had good fastness to light and washing.

EXAMPLE 29

0.5 part of a dye represented by the formula,

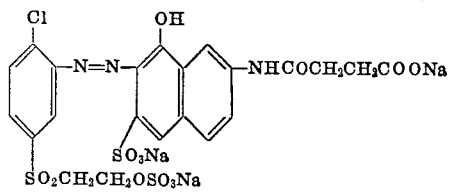

and 5 parts of urea were dissolved in 30 parts of hot water and 64.5 parts of a paste of sodium alginate was added thereto. A cotton cloth was printed with the dye paste thus prepared and after preliminary drying, the cotton cloth printed was dipped into 100 parts of an aqueous solution containing 10 parts of common salt, 15 parts of sodium carbonate, 5 parts of potassium carbonate, 5 parts of 40° Bé. caustic soda and 1 part of sodium silicate, at 95° C. for 10 seconds. Upon washing with water and soaping, an orange printing was obtained which had good fastness to light and washing.

A dye represented by the formula,

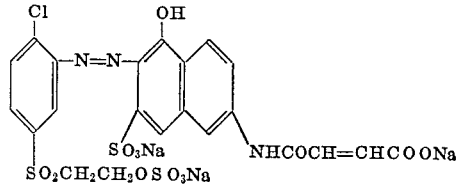

was used in the same way as mentioned above, thereby to obtain an orange dyeing which had good fastness to light and washing.

What we claim is:

1. A compound of the formula,

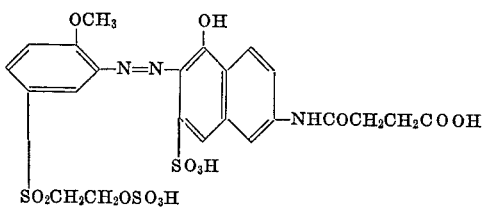

wherein one of $R_1$, $R_2$ and $R_3$ is —$SO_2CH_2CH_2OSO_3H$ and the others each represent hydrogen atom, chlorine atom, a lower alkyl group or a lower alkoxy group, and one of X and Y is hydrogen atom and the other is —$NHCOCH_2CH_2COOH$ or —$NHCOCH=CHCOOH$.

2. A compound of the formula,

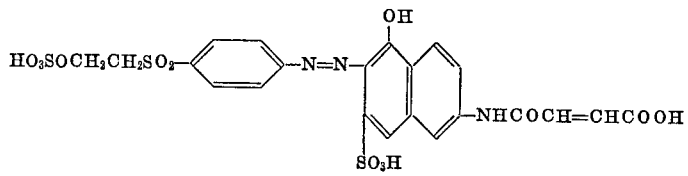

3. A compound of the formula,

4. A compound of the formula,
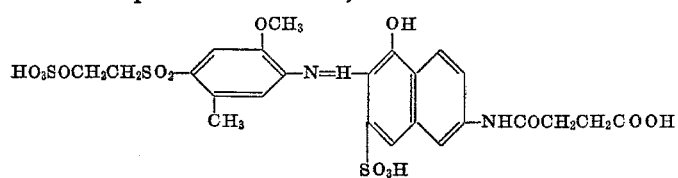
References Cited
UNITED STATES PATENTS
| | | | |
|---|---|---|---|
| 2,189,262 | 2/1940 | Fleischhauer | 260—199 |
| 2,274,717 | 3/1942 | Lyford | 260—199 |
| 3,135,730 | 6/1964 | Heyna et al. | 260—200 X |
| 3,202,652 | 8/1965 | Meininger et al. | 260—200 |
JOSEPH PAUL BRUST, Primary Examiner
C. F. WARREN, Assistant Examiner
U.S. Cl. X.R.
8—1 N, 41 R; 260—518

UNITED STATES PATENT OFFICE
CERTIFICATE OF CORRECTION

Patent No. 3,649,615  Dated March 14, 1972

Inventor(s) Takuo Ikeda et al.

It is certified that error appears in the above-identified patent and that said Letters Patent are hereby corrected as shown below:

In the claim for priority, the date of the first document "48017/68" should read as follows:

-- July 8, 1968 --

Signed and sealed this 8th day of August 1972.

(SEAL)
Attest:

EDWARD M. FLETCHER, JR.
Attesting Officer

ROBERT GOTTSCHALK
Commissioner of Patents